United States Patent
Manchala et al.

(10) Patent No.: US 8,015,053 B2
(45) Date of Patent: Sep. 6, 2011

(54) PROCESSOR, SYSTEM AND METHOD FOR ACCOMMODATING HIGH PRIORITY PRINT JOBS

(75) Inventors: Daniel W. Manchala, Torrance, CA (US); Charles H. Evans, IV, Los Angeles, CA (US); Chwan-Cheng N. Liu, Cerritos, CA (US); May G. Onaga, Cypress, CA (US); Jie Lin, Rochester, NY (US); Aillil I. Halsema, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 446 days.

(21) Appl. No.: 11/725,873

(22) Filed: Mar. 20, 2007

(65) Prior Publication Data

US 2008/0235158 A1 Sep. 25, 2008

(51) Int. Cl.
*G06Q 10/00* (2006.01)
*G06F 3/12* (2006.01)

(52) U.S. Cl. .................................. 705/7.26; 358/1.1
(58) Field of Classification Search .................. 705/400, 705/410, 408, 7.26; 358/1.9–1.14
See application file for complete search history.

(56) References Cited

U.S. PATENT DOCUMENTS

| | | | | |
|---|---|---|---|---|
| 5,327,526 | A | 7/1994 | Nomura et al. | 395/115 |
| 6,546,364 | B1* | 4/2003 | Smirnov et al. | 703/22 |
| 6,651,081 | B1 | 11/2003 | Salgado et al. | 709/103 |
| 6,671,065 | B1 | 12/2003 | Salgado et al. | 358/1.16 |
| 6,801,333 | B1* | 10/2004 | Weiss | 358/1.15 |
| 6,917,979 | B1* | 7/2005 | Dutra et al. | 709/229 |
| 7,009,719 | B2 | 3/2006 | Willis et al. | 358/1.1 |
| 7,542,155 | B2* | 6/2009 | Paskalev et al. | 358/1.13 |
| 7,796,283 | B2* | 9/2010 | Field | 358/1.13 |
| 2002/0113993 | A1* | 8/2002 | Reddy | 358/1.15 |
| 2003/0076525 | A1 | 4/2003 | Hikawa | 358/1.14 |
| 2003/0098991 | A1 | 5/2003 | Laverty et al. | 358/1.15 |
| 2003/0152212 | A1 | 8/2003 | Burok et al. | 379/265.02 |
| 2004/0070781 | A1* | 4/2004 | Matsugi | 358/1.14 |
| 2004/0145772 | A1* | 7/2004 | Stringham | 358/1.15 |
| 2005/0055697 | A1 | 3/2005 | Buco et al. | 718/105 |
| 2005/0151993 | A1 | 7/2005 | Gartstein et al. | 358/1.15 |
| 2005/0275875 | A1 | 12/2005 | Jennings, Jr. | 358/1.15 |
| 2005/0276618 | A1 | 12/2005 | Clement et al. | 399/24 |
| 2005/0289312 | A1* | 12/2005 | Ghosal et al. | 711/167 |
| 2006/0009989 | A1* | 1/2006 | McCormick | 705/1 |
| 2006/0061823 | A1* | 3/2006 | Riesel et al. | 358/1.16 |
| 2006/0193006 | A1* | 8/2006 | Lawrence et al. | 358/1.16 |
| 2006/0268317 | A1* | 11/2006 | Lofthus et al. | 358/1.15 |
| 2007/0165266 | A1* | 7/2007 | Tian | 358/1.15 |
| 2008/0005744 | A1* | 1/2008 | Buco et al. | 718/105 |

OTHER PUBLICATIONS

2001-E Kutanoglu et al. "Routing-based reactive scheduling policies for machine failures in dynamic job shops"—International Journal of Production, vol. 39, No. 14, 3141-3158.*

* cited by examiner

*Primary Examiner* — John W Hayes
*Assistant Examiner* — Tonya Joseph
(74) *Attorney, Agent, or Firm* — Alix, Yale & Ristas, LLP (57) ABSTRACT

Disclosed herein is a production planning processor comprising an admissions control module in communication with a queue management module, the admissions control module calculating a proposed profit for expedited handling of a new print job, the queue management module determining a revised print job queue based upon data received from the admissions control module. A corresponding method of processing print jobs is also disclosed, along with a system and a method for determining the profitability of accommodating a rush print job.

19 Claims, 5 Drawing Sheets

PROCESSOR, SYSTEM AND METHOD FOR ACCOMMODATING HIGH PRIORITY PRINT JOBS

BACKGROUND

The embodiments disclosed herein generally relate to printing and more particularly to the handling of rush print jobs in a high volume printing operation.

In a print shop, jobs often are accepted manually by the print administrators and assigned to print operators. If the print shop is busy, the jobs typically are aligned one against the other with little room to insert any rush print jobs. In such cases, when a rush order job arrives, the print administrator must manually re-schedule print jobs in order to accommodate the rush job.

Methods are known for estimating penalites resulting from the late delivery of services. U.S. Patent Application Publication 2005/0055697 A1 is directed to a method for resource allocation in which start times for a plurality of tasks are assigned in a manner that will minimize penalties for delayed completion times. Scheduling theory has been developed that addresses the rescheduling of jobs of various types based on completion time. For example, "Approximation Algorithms for Job Interval Selection Problems and Related Scheduling Problems-42$^{nd}$ IEEE Symposium on Foundations of Computer Science 2001", Rafail, describes the problems even for a single queue as NP-complete. In other words, development of an optimal solution requires an exhaustive search of all the possible solutions. This analysis takes an exponential time in the amount of the number of jobs.

It would be useful to develop an automated system for efficiently and profitably rescheduling print jobs in one or more print shops to accommodate a rush order.

SUMMARY

One embodiment is a production planning processor comprising an admissions control module in communication with a queue management module. The admissions control module calculates a proposed profit for expedited handling of a new print job, and the queue management module determines a revised print job queue based upon data received from the admissions control module. In some cases, the admissions control module includes a cost analyzer configured to determine service cost and completion time for each submitted print job. In certain instances, the queue management module includes a job routing portion configured to manage a plurality of printer queues. The queue management module often comprises a memory containing printer queue data. The queue management module sometimes includes a job batching portion. Sometimes, the cost analyzer contains data for quality of service requirements.

In certain embodiments, the admissions control module calculates the proposed profit for expedited handling of the new print job by calculating at least one of (a) a maximum profit $P_{max}$ for accommodating the rush print job with minimal penalties, (b) a simple profit $P_s$ based on placement of the rush print job at the beginning of the queue without re-ordering other print jobs, and (c) a consolidation profit $P_{con}$ based on a reduction in padding time between existing queued print jobs.

Another embodiment is an automated system for determining the profitability of accommodating a rush print job, comprising a production planning processor configured to determine a first profit for expedited handling of the rush print job by calculating at least one of (a) a maximum profit $P_{max}$ for accommodating the rush print job with minimal penalties, and (b) a consolidation profit $P_{con}$ based on a reduction in padding time between queued print jobs. The processor sometimes is configured to calculate $P_{max}$ wherein the rush print job is to be accommodated by inserting the rush print job into an existing queue without re-ordering print jobs. Sometimes, the processor is configured to calculate $P_{max}$ when the rush print job is to be accommodated by inserting the rush print job into an existing queue and re-ordering at least one print job in the existing queue.

Another embodiment is a method of processing print jobs, comprising obtaining a queue of multiple print jobs, receiving a request for processing a rush print job, determining a first profit for expedited handling of the rush print job, communicating with a queue management module to re-prioritize queued print jobs to accommodate the rush print job, and scheduling the rush print job. Existing queued print jobs can then be automatically re-prioritized to accommodate the rush print job, or the rush print job can be rejected, based on the value of the first profit.

In some cases, the first profit is determined by calculating at least one of (a) a maximum profit $P_{max}$ for accommodating the rush print job with minimal penalties, (b) a simple profit $P_s$ based on placement of the rush print job at the beginning of the queue without re-ordering other print jobs, and (c) a consolidation profit $P_{con}$ based on a reduction in padding time between existing queued print jobs. In many cases, $P_{max}$ is calculated by subtracting penalties for delayed print jobs from anticipated profit for the rush print job. In some cases, the processor is configured to calculate $P_{max}$ when the rush print job is to be accommodated by inserting the rush print job within a long batched job of an existing queue and re-ordering at least one other print job in the queue.

A method of determining the profitability of accommodating a rush print job in a system having multiple printing queues, comprising inputting the expected duration of the rush print job, inputting the potential profit of the rush print job, selecting the printing queue with the greatest capacity to accommodate the rush print job, and determining a first profit for expedited handling of the rush print job by calculating at least one of (a) a maximum profit $P_{max}$ for accommodating the rush print job with minimal penalties in the selected printing queue, (b) a simple profit $P_s$ based on placement of the rush print job at the beginning of the selected printing queue without re-ordering other print jobs, and (c) a consolidation profit $P_{con}$ based on a reduction in padding time between print jobs in the selected printing queue. In some cases, the selected printing queue is selected automatically based upon a calculation of $P_s$ for at least two of the printing queues. Sometimes, both $P_{con}$ and $P_s$ are considered in determining the first profit for expedited handling of the rush print job.

BRIEF DESCRIPTION OF THE DRAWINGS

FIG. 4 is a flowsheet showing a method of calculating profits according to another embodiment, FIG. 5 schematically shows a print job queue with a padding time Td between each print job and with a rush job inserted within a batched job, and FIG. 6 schematically shows a printing system with multiple queues.

DETAILED DESCRIPTION

A production planning processor, method and system are provided herein to process rush print jobs. The disclosed embodiments provide for automated profitability analysis and automated accommodation of a rush print job in a single queue or within one of a set of multiple queues.

As used herein, a "production planning processor" is a computerized processor for managing the planning of a printing function. An "admissions control module" is a portion of the production planning processor that receives data regarding new print jobs. A "queue management module" as used herein is a portion of the production planning processor that manages one or more printing queues. As used herein, a "revised print job queue" is a print job queue into which a rush print job has been inserted.

A "job routing portion" of the queue management module, as used herein, is the part of a queue management module that manages multiple printer queues. As used herein, a "job batching portion" is the part of a queue management module that is capable of grouping print jobs into batches. As used herein, the term "printer" encompasses any apparatus, such as a digital copier, bookmaking machine, facsimile machine, multi-function machine, etc. that performs a print outputting function for any purpose.

In accordance with embodiments described herein, a production planning processor enables a print shop to be equipped with quality of service capabilities for optimized operations. This enables profits to be maximized while meeting the desired service parameters.

In one scenario, processing of a rush print job according to one or more of several different outcomes is considered. First, the job can be accepted by altering the state of the print environment in a way that minimizes alterations to quality of service for the other print jobs. Second, the job can be accepted after the quality of service parameters are adjusted as a result of negotiations with the submitter. Third, the job can be re-routed to another print shop. Fourth, the job can be rejected. The techniques described herein substantially preserve the quality of service parameters of the print jobs that are already scheduled in the print shop enterprise while taking into account costs involved in re-prioritizing particular print jobs. In some cases, the system and method consider the padding time between print jobs in determining the most profitable way of handling displaced or delayed print jobs.

In print shops that have several jobs concurrently running on different pieces of equipment, each print job is assigned its own quality of service parameters. Non-limiting examples of such parameters include turn-around time, delivery date, grammatical errors, punctuation errors, language usage problems, color discrepancies, presentation quality, cost, and price that is charged. While efforts are made to meet these quality requirements, disruptions to the print production process resulting in a delay for at least some of the print jobs inevitably occur. Common reasons for a disruption are a paper jam, the need to replenish toner, employee absence, delays in proofing, power supply interruptions, and the receipt of a rush print job. By using the disclosed processor, method and system to accommodate rush print jobs, profits can be maximized with minimal penalties to previously scheduled print jobs.

A production planning processor enables a production print shop to be equipped with quality of service capabilities for optimized operations. For example, when a rush order with certain quality of service requirements (deadline, quality, separate online retrieval of fonts, images, etc) is submitted, the system will be able to determine if the rush order can be admitted into the system only if the quality of service requirements can be guaranteed to be met without changing any of the service parameters associated with other orders. When jobs inside the system have a certain leeway (for example, when the quality of service requirement for an order calls for completion by Friday 15 Dec. 2006 and the order under the current load could be completed much earlier, e.g. Wednesday 13 Dec. 2006 there is a 2 day leeway), the new order can be admitted, and another order's completion time changed thereby reducing the leeway. Such a quality of service arrangement could be made with the new processor. Similarly, when the workload within the printing environment is within control, a print shop can use the processor to determine that it has the capacity to bid for other print orders or seek orders from other overloaded print shops. A statistical tool can be included to maintain a historical log of print orders and to advise of the need for additional resources.

Figure 1:
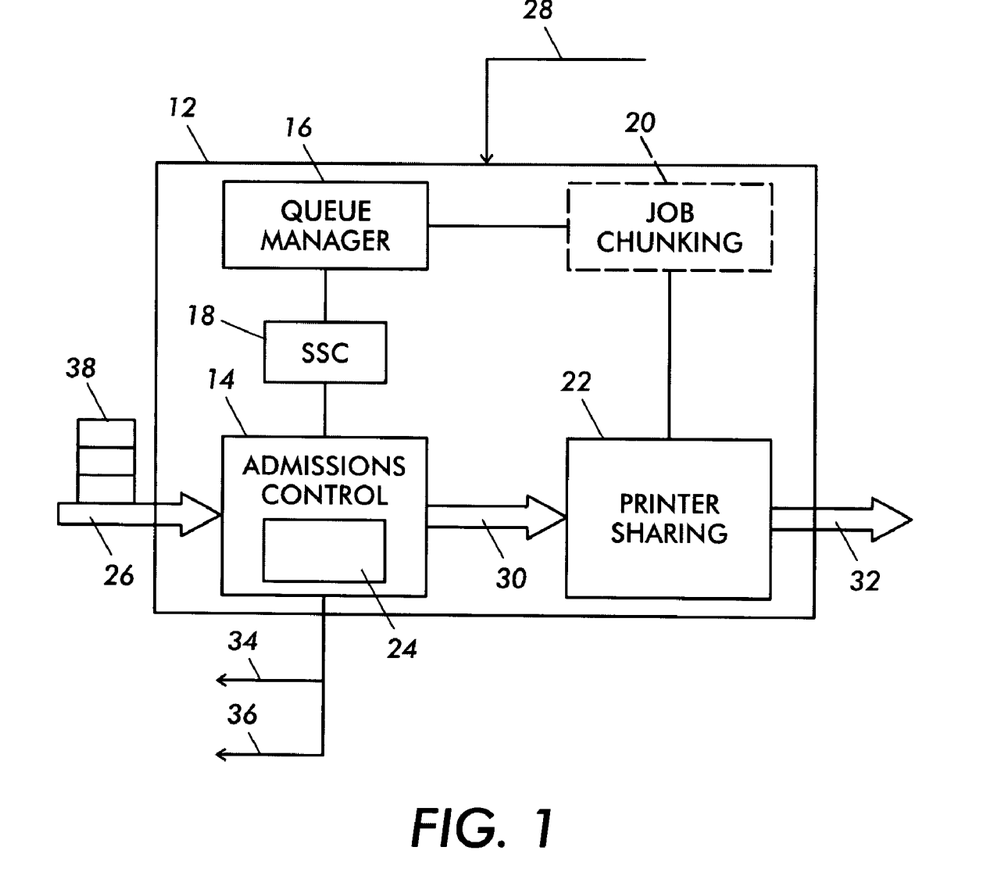
FIG. 1 schematically shows a production planning processor according to an embodiment described herein.

FIG. 1 schematically shows a production planning processor, generally designated as 12. The production planning processor 12 includes an admissions control module 14 that determines which jobs are to be accepted for printing at the print shop. The production planning processor 12 can be part of a computer that is operative of printer hardware or can be a separate processor located upstream from such a computer. In the embodiment of FIG. 1, the production planning processor 12 includes a queue manager 16 that contains a list of print jobs. In some cases, the queue manager 16 is external from, but in communication with, the production planning processor 12.

The admissions control module 14 and the queue manager 16 are connected to one another through a system state controller (SSC) 18 that looks at the current state of the system with respect to the queue. In some cases the system state controller 18 also will look at printer resources such as font availability. The system state controller 18 can be part of the queue manager 16 or the admissions control module 14.

In certain cases, the queue manager 16 is connected to a job chunking module 20 that divides a large print job into batches of subjobs to facilitate manageability. Each sub-job can be started or stopped independently of the others. The sub-jobs can be sequentially sent to the same printer or they can be sent in parallel to multiple printers. The job chunking module 20 informs the queue manager 16 how the job is split into sub-jobs so that the queue manager can list each sub-job separately. The job chunking module 20 creates a data structure for the job. The data structure contains information for the start and stop pointers for each sub-job. For example, in a variable printing scenario of printing and mailing checks, the start pointer is the start number of the next set of checks to be printed, how many checks are in the batch (sub-job), and optional related information such as pointers to database entries to get the name, amount, mailing information, etc.

The job chunking module 20 (or the queue management module 16 if no job chunking module 20 is included) is connected to a printer sharing module 22 that handles routing and scheduling of print jobs. The printer sharing module 22 is connected to admissions control module 14 and is configured to receive print job data from the admissions control module 14.

The admissions control module 14 usually has included therein a cost analyzer 24 that estimates service cost and completion time for print jobs. It is noted that the cost analyzer 24 can be external to and in communication with the admissions control module 14.

Arrows 26, 30 and 32 in FIG. 1 are the main data flow pathways. Data for a print job passes from the input to the output of the process along these pathways. When a new print job order 38 is submitted at arrow 26 to the production planning processor 12, job status from various printer queues, which is communicated to the production planning processor 12 at 28, is conveyed to the admissions control module 14. Job status information often is provided to the SSC 18 continuously and is passed to the admissions control module 14 when a new job arrives. The cost analyzer 24 estimates the service cost and completion time for the print job. If it appears that the print job can be processed at a profit, the admissions control module 14 conveys to the SSC 18 a new desired state. The SSC 18 then manipulates the queues in the queue manager, reprioritizing the jobs in the queue, if necessary, to satisfy the quality of service requirements for each job. After (optional) consideration of job chunking at 20, information, such as commands, relating to the print job are conveyed from the queue management module 16 to the printer sharing module 22. The admissions control module 14 transfers print job data to the printer sharing module 22 at arrow 30, and the print job is then routed to a printer through the printer sharing module 22 at arrow 32.

On the other hand, if the cost analyzer 24 determines that the print job cannot be profitably processed while meeting quality of service parameters, the admissions control module 14 either notifies the submitter that the print job is to be rejected at 34, or re-routes the print jobs to another station or print shop at 36.

Figure 2:
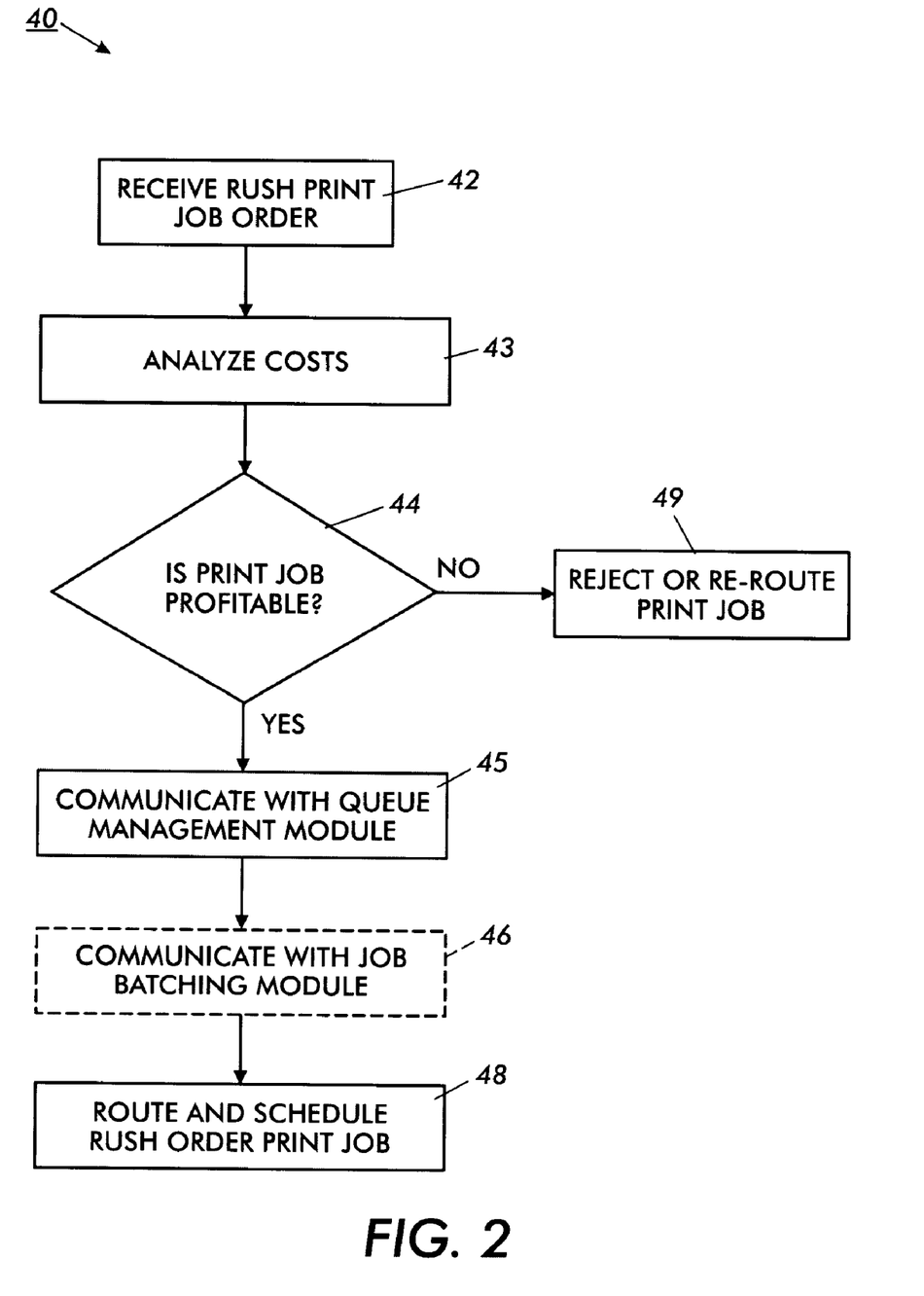
FIG. 2 is a flowsheet showing a method according to one embodiment.

FIG. 2 is a flowsheet, designated as 40, providing a method of accommodating rush print jobs in accordance with certain embodiments described herein. When data for a rush print job is received at 42, the user analyzes costs at 43. If the job is found to be profitable at 44, information about the print job is communicated to the queue management module at 45. The queue management module then optionally communicates with a job batching module at 46. Finally, the rush print job order is routed and scheduled at 48. If the job is found to not be profitable at 44, it is rejected or re-routed at 49.

Figure 3:
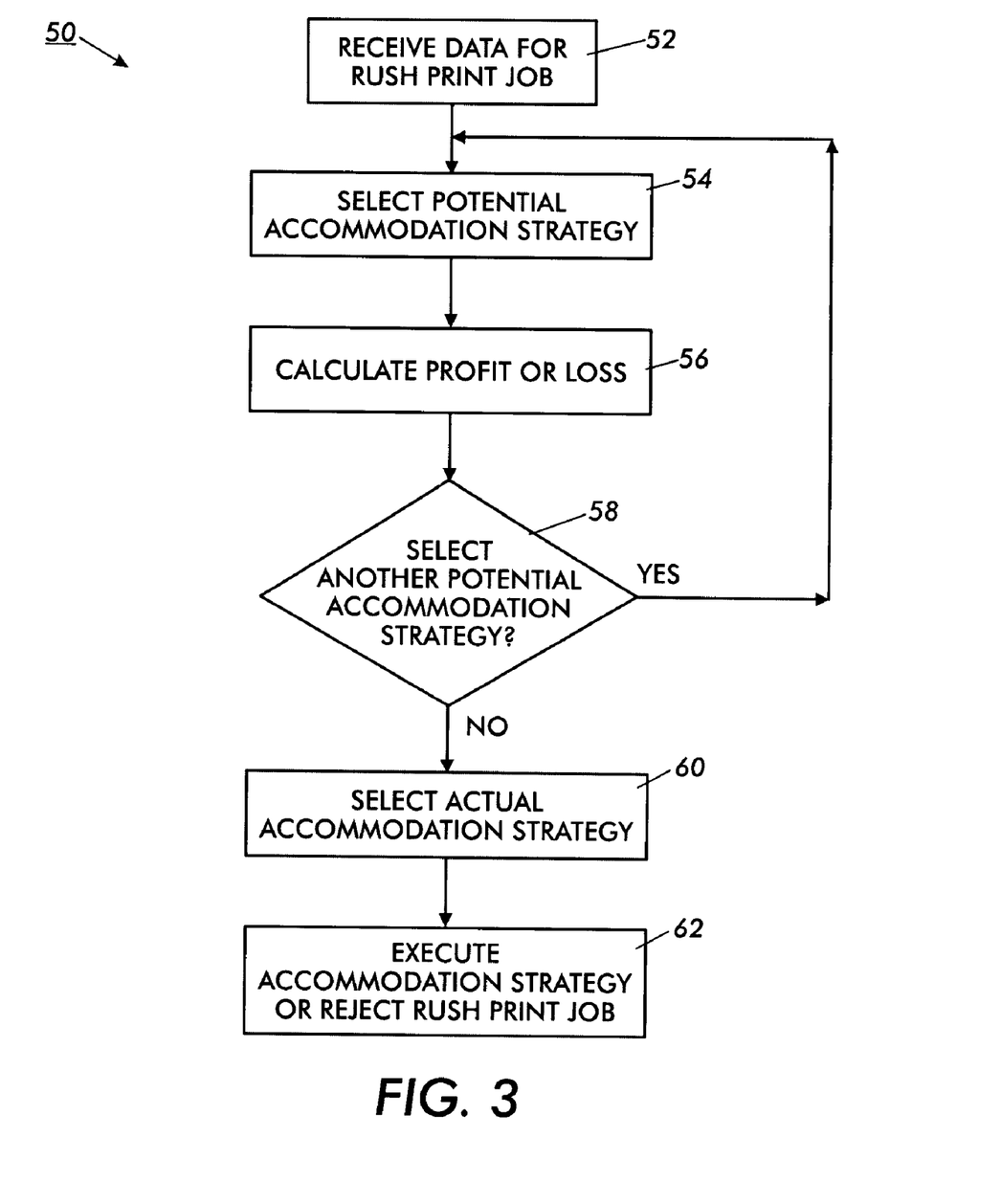
FIG. 3 is a flowsheet showing a method of calculating profits for accommodating a rush print job.

FIG. 3 is a flowsheet, designated as 50, providing a method of accommodating rush print jobs in accordance with certain embodiments described herein. When data for a rush print job is received at 52, the user then selects a potential accommodation strategy at 54. The profit or loss using the selected accommodation strategy is then calculated at 56. The user then decides whether on not to consider other potential accommodation strategies at 58. If so, a second potential accommodation strategy is selected at 54 and the profit is calculated at 56. Next, the user decides whether or not to consider a third potential accommodation strategy. If so, a third potential accommodation strategy is selected at 54 and the profit is calculated at 56. When the user determines at 58 that no other potential accommodation strategies are to be selected, they select an actual accommodation strategy at 60, which usually will be the strategy that results in the highest profit. The selected actual accommodation strategy is then executed, or the rush print job is rejected if no profit can be realized, at 62.

In many cases, a padding time has been inserted between scheduled print jobs in a queue. Padding time is used to take into account delays caused by errors in calculating the estimated processing time, start-up time, time to load a printer with a certain paper, remove jams, replace toner and many other unanticipated events. If the padding time is too large, the total productivity of the print shop is reduced because the machines sit idle during the padding time if no delay-causing event occurs. If the padding time is too small, orders promised for completion by a certain time get delayed either due to wrong estimates or due to unanticipated events.

Padding time is variable and the variability can be viewed as a function of the demand for the handling of rush print jobs. Based on historical data collected by the print shop, demand for rush orders can be included in the equation to determine the suitable padding time. Based on historical values, if the anticipated demand for rush orders is high, the padding time is increased for normally accepted jobs. This is because the extra padding time is useful to accommodate more than one rush order job, thus gaining more profit. On the other hand, if the demand for rush orders is small, the padding time also can be small. The padding time typically ranges from 5 minutes to 40 minutes, with a mean of 20 minutes. During peak seasons, when rush orders increase by 10%, the padding time may be increased, for example, by 5 minutes.

Padding time alone can be used to accommodate a rush print job if the sum of the padding times between the time of receipt of the rush print job and the required completion time for the rush print job are sufficient greater than the expected duration of the rush print job that the rush print job can be absorbed into the queue.

In the method and system described herein, a job order can be modeled using the following variables:

$T_s$ is the scheduled start time, $T_a$ is the job arrival time, $T_p$ is the expected processing time (calculated by looking at the size of the job, the average time it takes to complete a unit size of that particular kind of job), $T_d$ is the delay time (including the startup time and switch-over time from job to job, paper loading, removing paper jams, re-loading toner as necessary), $T_c$ is the shop's estimated completion time: $T_c = T_s + T_p + T_d$, $T_f$ is the customer's expected finished time (according to the signed estimate), $C_q$ is the cost quoted to the customer (an estimate) for a non-rush order job, $C_p$ is the penalty cost (this is billed to the customer as a discount on the job), $C_r$ is the cost quoted to the customer for a rush order job, and $C_e$ is the estimated over-profit on the rush order job: $C_e = C_r - C_q$.

$C_n$ is the net over-profit after subtracting the penalties from the over-profit.

Several different methods for accommodating a rush job order are provided in the Examples. Assumptions vary from one model to the next.

In each case the profit to be made on a rush job is weighed against the financial penalties for print jobs that will be delayed as a result of the accommodation of the rush job. For each job, there is a penalty cost $C_p$ for not having the job completed by the customer's expected completion time $T_f$. When a rush print job arrives, certain jobs are identified to be placed in a discounted section of the queue (usually at the end of the current queue), with each delayed job incurring a loss or penalty of $C_p$ for the print shop, given as a discount to the customer. In this model, a rush order job is accepted into the print shop on a rush basis if the sum of all of the job penalties is less than the profit gain from accepting the rush order job. In other words, if $(\Sigma_k C_p) < C_e$, for all jobs k in the discounted queue, acceptance of the rush job is recommended. The task of identifying or selecting jobs to be pushed to the end of the queue (to the discounted section) is described later.

At a certain instant (e.g. 2:30 pm), there is a job queue having the following jobs (assuming that jobs are placed in the queue in a first come first served (FCFS) basis):

| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00) |
|---|---|
| Job (i + 1) | ($T_a$ = 2:00 pm, $T_f$ = 5:30 pm, $T_s$ = 3:00 pm, $T_p$ = 1 hour, $T_c$ = 4:20 pm, $C_q$ = $50.00) |
| Job (i + 2) | ($T_a$ = 2:30 pm, $T_f$ = 6:30 pm, $T_s$ = 5:00 pm, $T_p$ = 40 min, $T_c$ = 6:00 pm, $C_q$ = $40.00) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00) |

In all cases, if $T_d$=20 minutes, then $C_p$=20% off the order.

EXAMPLE 1

Scheduling Rush Order Job as Soon as Possible (Greedy Algorithm)

If, at 2:45 pm, a certain rush order job arrives with the following quality of service characteristics: Job (rush) ($T_a$=2:45 pm, $T_f$=5:45 pm, $T_p$=1 hour, $C_r$=$150.00), the result of greedily accepting the rush job to be performed next would be as follows:

| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00, $C_p$ = $0.00) |
|---|---|
| Job (rush) | ($T_a$ = 2:45 pm, $T_f$ = 5:45 pm, $T_s$ = 3:00 pm, $T_p$ = 1 hour, $T_c$ = 4:20 pm, $C_r$ = $150.00, $C_q$ = $80.00) |
| Job (i + 1) | ($T_a$ = 2:00 pm, $T_f$ = 5:30 pm, $T_s$ = 4:20 pm, $T_p$ = 1 hour, $T_c$ = 5:40 pm, $C_q$ = $50.00, $C_p$ = $10.00) |
| Job (i + 2) | ($T_a$ = 2:30 pm, $T_f$ = 6:30 pm, $T_s$ = 5:40 pm, $T_p$ = 40 min, $T_c$ = 6:40 pm, $C_q$ = $40.00, $C_p$ = $8.00) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00, $C_p$ = $0.00) |

In this case, the total penalties ($\Sigma_k C_p$) are $18.00, whereas the revenue by accepting a rush job is $150.00. The estimated over-profit by accepting the job $C_e$ is $C_r - C_q$=($150.00−$80.00)=$70.00; the net over-profit after taking the penalties $C_n$ is ($C_e - \Sigma_k C_p$)=($70.00−$18.00)=$52.00. The print shop can thus determine whether the additional profit justifies immediate acceptance and processing of the rush order job.

In some cases the quality of service policy might require the operator to call each of the customers who have jobs (i+1) to (i+3) and get approval to delay the job in lieu of, or in addition to, a certain discount offered by the shop to the customer.

In summary, the following process can be used if the rush print job is to be scheduled immediately:

```
// possible start time: when a rush order job could possibly begin after
i, i+1, i+2 . . . jobs.
// estimated start time: when a rush order job must start in order to
complete by the requested finish time.
While rush order's (possible start time > estimated start time) {
    Select the first available position right after the current (running) job.
    for all jobs displaced down the queue,
        calculate penalty cost for each job
    calculate overall loss i.e., the sum of all penalties for those jobs that
    would be delayed;
    if the loss < the profit gain obtained by accepting the rush job, then
        accept the rush job;
        insert it into the selected position;
        exit;
    else
        select next position, with a new possible start time
} // End-while
    outsource job or reject job.
```

EXAMPLE 2

Positioning a Rush Order Job with Lowest Economic Penalty

If the rush order of Example 1 were placed after job (i+1), the resulting penalty would be less ($8.00 instead of $18.00). This is shown as follows:

| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00, $C_p$ = $0.00) |
|---|---|
| Job (i + 1) | ($T_a$ = 2:00 pm, $T_f$ = 5:30 pm, $T_s$ = 3:00 pm, $T_p$ = 1 hour, $T_c$ = 4:20 pm, $C_q$ = $50.00, $C_p$ = $0.00) |
| Job (rush) | ($T_a$ = 2:45 pm, $T_f$ = 5:45 pm, $T_s$ = 4:20 pm, $T_p$ = 1 hour, $T_c$ = 5:40 pm, $C_r$ = $150.00, $C_q$ = $80.00) |
| Job (i + 2) | ($T_a$ = 2:30 pm, $T_f$ = 6:30 pm, $T_s$ = 5:40 pm, $T_p$ = 40 min, $T_c$ = 6:40 pm, $C_q$ = $40.00, $C_p$ = $8.00) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00, $C_p$ = $0.00) |

The analysis can be repeated with the rush job being inserted after Job (i+2) and after Job (i+3).

In summary, the following process can be used if the rush job is to be scheduled to result in the lowest economic penalty:

```
// k: possible position for a rush order job after the currently running job.
// C_nk : net over-profit when rush order job is inserted in position k.
While rush order's (possible start time T_k > estimated start time T_s) {
    For each position k
    for all jobs displaced down the queue{
        calculate the penalty cost for each job when the rush order job
        is inserted into a particular location in the queue (position k) - the
        loss L_k being the sum of all penalties for those jobs that would be
        delayed; calculate C_nk = C_e − L_k.
        save C_nk
    }
    Find the largest of C_nk. Let the position at which this occurs be k-high.
    Accept the rush job;
    Insert it into the position k-high;
    Sort all jobs below the rush job by
        moving small penalty job(s) to the end of the queue
        moving up other profitable jobs behind rush order job
    Exit;
} // End-while. Could not find a position in the queue to fit the rush job
and getting a net over-profit > 0. Therefore outsource or reject the job.
```

EXAMPLE 3

Inserting a Regular Length Rush Order Job by Looking at Expected Finish Time

| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00) |
|---|---|
| Job (i + 1) | ($T_a$ = 2:00 pm, $T_f$ = 5:30 pm, $T_s$ = 3:00 pm, $T_p$ = 1 hour, $T_c$ = 4:20 pm, $C_q$ = $50.00) |

-continued

| | |
|---|---|
| Job (i + 2) | ($T_a$ = 2:30 pm, $T_f$ = 6:30 pm, $T_s$ = 5:00 pm, $T_p$ = 40 min, $T_c$ = 6:00 pm, $C_q$ = $40.00) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00) |

In all cases, if $T_d$=20 minutes, then $C_p$=20% off the order.

If, at 2:45 pm, a certain rush order job arrives with the following quality of service characteristics:

Job (rush) ($T_a$=2:45 pm, $T_f$=5:30 pm, $T_p$=1 hour, $C_r$=$150.00), the rush job can be scheduled as late as possible while meeting the time requirement of the rush job. Using the same set of regularly scheduled jobs as in Example 2, the closest job with the same finish time is Job (i+1) $T_f$=5:30 pm. The rush job $T_c$ is 4:20 pm which fits well between Job (i) and Job (i+2). The rush order job can be accepted after contacting the Job (i+1) customer to get approval to delay the job, possibly in exchange for a 20% discount. The print shop's potential profit would be $140.00 (Job (rush) $C_r$=$150.00–Job (i+1) $C_p$=10.00). The delayed Job (i+1) would move to the end of the queue and have a new $T_s$=9:00 pm.

| | |
|---|---|
| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00) |
| Job (rush) | ($T_a$ = 2:45 pm, $T_f$ = 5:30 pm, $T_s$ = 3:00 pm, $T_p$ = 1 hour, $T_c$ = 4:00 pm, $C_r$ = $150.00) (replaced with Job (i + 4)) |
| Job (i + 2) | ($T_a$ = 2:30 pm, $T_f$ = 6:30 pm, $T_s$ = 5:00 pm, $T_p$ = 40 min, $T_c$ = 6:00 pm, $C_q$ = $40.00) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00) |
| Job (i + 4) | ($T_a$ = 2:00 pm, $T_f$ = 5:30 pm, $T_s$ = 9:00 pm, $T_p$ = 1 hour, $T_c$ = 10:00 pm, $C_q$ = $50.00) |

EXAMPLE 4

Inserting a Large Rush Order Job by Looking at the Expected Finish Time

As in Example 3, Jobs i to (i+3) are scheduled as follows:

| | |
|---|---|
| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00) |
| Job (i + 1) | ($T_a$ = 2:00 pm, $T_f$ = 5:30 pm, $T_s$ = 3:00 pm, $T_p$ = 1 hour, $T_c$ = 4:20 pm, $C_q$ = $50.00) |
| Job (i + 2) | ($T_a$ = 2:30 pm, $T_f$ = 6:30 pm, $T_s$ = 5:00 pm, $T_p$ = 40 min, $T_c$ = 6:00 pm, $C_q$ = $40.00) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00) |

If, at 2:45 pm, a certain large rush order job arrives with the following quality of service characteristics:

Job (rush) ($T_a$=2:45 pm, $T_f$=6:30 pm, $T_p$=3 hour, $C_r$=$150.00), the rush job can be inserted as late as possible while meeting the time requirement of the rush job. Using the same set of regularly scheduled jobs as in Example 2, the closest job with the same finish time is Job (i+2) $T_f$=6:30 pm. The rush job $T_c$ is 6:20 pm which does not fit well between Job (i+1) and Job (i+3). The next job (i+1) would need to be delayed in order to fit the rush order job. The rush order job can be accepted after calling the Job (i+1) and Job (i+2) customers to get approval to delay the jobs and, perhaps in exchange, accept a 20% discount. The print shop potential profit would be $132.00 (Job (rush) $C_r$=$150.00–Job (i+1) $C_p$=10.00–Job (i+2) $C_p$=8.00). Delayed Job (i+1) and Job (i+2) would move to the end of the queue and have a new $T_s$=9:00 pm and $T_s$=10:00 pm, respectively.

| | |
|---|---|
| Job (i) | ($T_a$ = 1:30 pm, $T_f$ = 5:00 pm, $T_s$ = 2:00 pm, $T_p$ = 40 min, $T_c$ = 3:00 pm, $C_q$ = $30.00) |
| Job (rush) | ($T_a$ = 2:45 pm, $T_f$ = 6:30 pm, $T_p$ = 3 hour, $T_c$ = 6:20 pm, $C_r$ = $150.00) (replaced with Job (i + 4)) (replaced with Job (i + 5)) |
| Job (i + 3) | ($T_a$ = 2:30 pm, $T_f$ = 9:00 pm, $T_s$ = 7:00 pm, $T_p$ = 80 min, $T_c$ = 8:40 pm, $C_q$ = $100.00) |
| Job (i + 4) | ($T_a$ = 2:00 pm, $T_f$ = 5:30 pm, $T_s$ = 9:00 pm, $T_p$ = 1 hour, $T_c$ = 10:00 pm, $C_q$ = $50.00) |
| Job (i + 5) | ($T_a$ = 2:30 pm, $T_f$ = 6:30 pm, $T_s$ = 10:00 pm, $T_p$ = 40 min, $T_c$ = 10:40 pm, $C_q$ = $40.00) |

In summary, for Examples 3 and 4, the following process can be used if the rush job is to be scheduled to be completed near (and before) the requested finish time.

```
While rush order's (expected finish time < job K's expected finish time) {
    For all jobs from k to the top of the queue
        if rush job fits between job (k) and job (k–1)
            move job (k–1) to the end of the queue
            re-adjust job (k–1) start time
        else
            If there is no job left to displace in the queue
                Outsource job or reject job
    }//end for
}//end while.
```

EXAMPLE 5

Accommodating a Rush Print Job by Reducing the Padding Time $T_d$ Between Jobs

Figure 5:
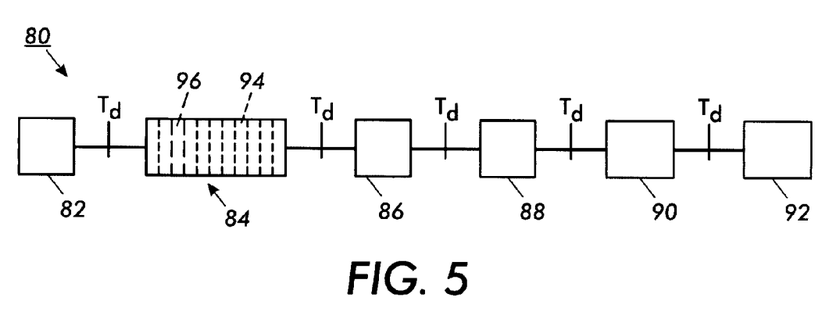

FIG. 5 schematically shows a print job queue, generally designated as 80. The queue has six jobs, designated as 82, 84, 86, 88, 90 and 92, respectively. At the beginning of each day or print cycle run, a padding time $T_d$ is inserted between print jobs to account for such things as replacing toner, paper stock, breaks for operators, etc. A rush order job could be accommodated for example, by reducing the padding time $T_d$ between print jobs. If the print jobs were in a queue with a padding time of 20 minutes between each job, a 25 minutes rush job could be accommodated by reducing the padding time to 5 minutes, thereby creating a space of 30 minutes (25 minutes for the job and 5 minutes of padding time) merely by squeezing the padding time of 2 jobs.

Figure 4:
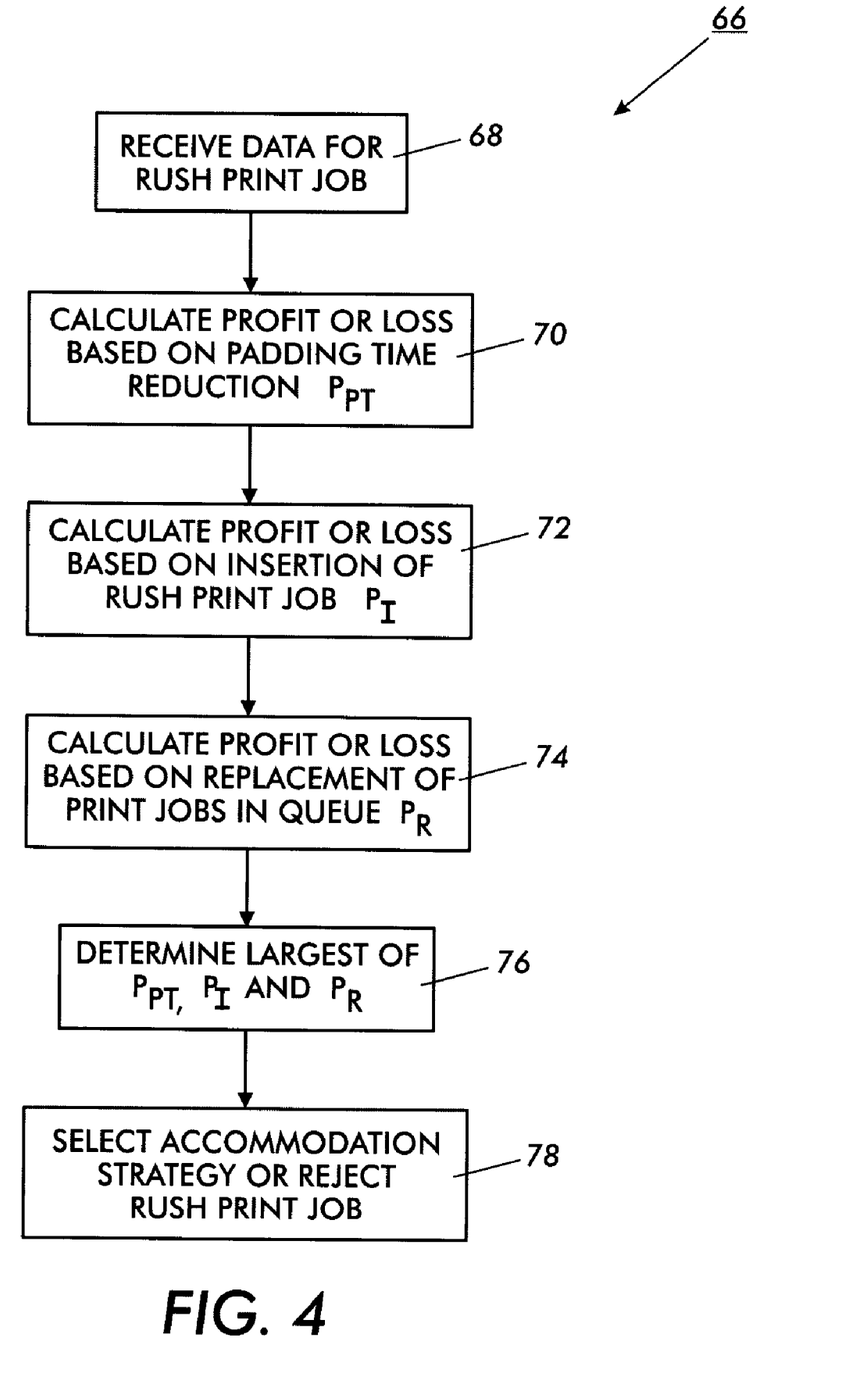

Thus, when it is desired to consider more than one type of analysis for determining the profit for accommodating a rush print job, a method such as that depicted in FIG. 4 and designated as 66 can be used. First, data for the rush print job is received at 68. This data typically includes the estimated processing duration, the requested completion time and the income expected from the sale of the rush print job. Next, various techniques are used to calculate the profit or loss that could result from accommodation of the rush print job at 70, 72 and 74. In the embodiment shown in FIG. 4, the profit or loss based on padding time $P_{PT}$ is calculated at 70, the profit or loss based on insertion of the rush print job $P_I$ is determined at 72, and the profit or loss based on replacement of one or more print jobs in the queue which are then moved to the end of the queue, $P_R$, is determined at 74. The largest of $P_{PT}$, $P_I$ and $P_R$ is then determined at 76, and an accommodation strategy is selected or the print job is rejected at 78.

EXAMPLE 6

Accommodating a Rush Print Job within a Batched Job by Reducing the Padding Time $T_d$ between Jobs If, in Example 5, one of the print jobs in the queue was a batched print job, the rush job could be inserted in between a pair of print jobs in the batch. In FIG. 5, the second print job 84 is a batched print job containing 10 separate sub-jobs 94. A rush print job 96 is inserted in between the second and third sub-jobs in the batch. Other ways to further accommodate the print job within the batch print job 84 could involve re-prioritization of print jobs 82, 86, 88, 90 and/or 92.

Figure 6:
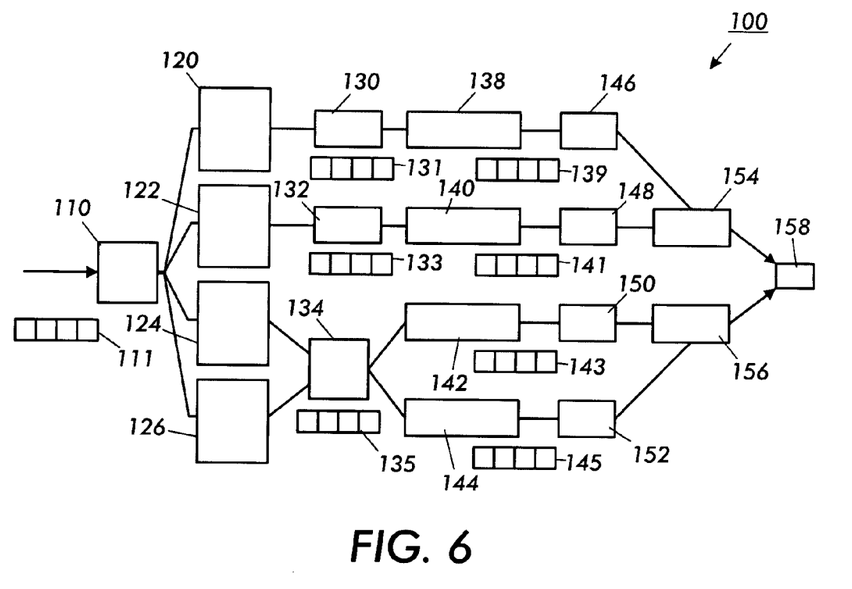

The above examples 1-6 show several ways in which a rush order can be accepted into an enterprise with one queue. Usually, a print enterprise contains many queues as shown in FIG. 6. In such an enterprise, designated generally as 100, a production planning processor 110 is disposed upstream from and connected with a plurality of production lines, four of which are shown in FIG. 6. A queue 111 is associated with the production planning processor 110. Each production line can be at the same location, or one or more of the production lines can be at a different location than the others. Furthermore, each part of a particular production line can be at a different location than the other parts of the same production line.

Each production line has a pre-press section, designated as 120, 122, 124 and 126 (numbered from top to bottom on the Figure). The pre-press section provides functions such as imposition, color management, data conversion (from one format to another for example from MS-Word to PDF, RDO to PDF, XPS to PDF, InDesign to PDF, Illustrator to PDF, CorkExpress to PDF, and etc), auto-edit (adding page numbers, tabs, watermarks, etc), pre-flight (providing a report on the errors, estimated job processing time, availability of fonts, etc). An output manager is associated with each printer. In FIG. 6, an output manager 130, which typically is a computer that is operative of printer hardware, is connected to pre-press section 120 and is associated with a printer 138. Output manager 130 has queue 131. Output manager 132 is connected to pre-press section 122 and is associated with printer 140. Output manager 132 has queue 133. Output manager 134 is connected to pre-press sections 124 and 126 and is associated with both printer 142 and printer 144. Output manager 134 has queue 135. The output manager 134 can contain an internal queue that separates different types of documents, such as black and white documents vs. color documents, and sends them to different printers. Each printer is connected to a post press assembly section, including, for example, a collating and binding station, designated as 146, 148, 150 and 152, respectively. The collating and binding stations have queues 139, 141, 143 and 145, respectively. Following collation and binding, there are one or more packaging stations. In FIG. 6, collating and binding stations 146 and 148 are connected to packaging station 154, and collating and binding stations 150 and 152 are connected to packaging station 156. From the packaging stations 154 and 156, documents are submitted to an appropriate end point, such as a mailroom 158.

In a multiple queue environment, the above-described algorithms are applied at each of the sections, thereby re-scheduling the jobs within each path. Sometimes it is necessary to move the jobs across the previously planned paths to accomplish the quality of service requirements of a rush order job. Once documents are printed, the printed documents may physically be needed to move across the paths. The status of each of the queues is fed back to the previous section's algorithm processor to determine the status of jobs in each of the sections ahead in the path. Dynamic programming concepts can be used to determine which queue can accommodate a rush order most efficiently. More particularly, dynamic programming can be used to break a problem into sub-problems, solve each one recursively, and construct an overall optimal solution from the solution to each of the sub-problems. In this case, the algorithm used at each of the sub-sections is a programming sub-problem. The solutions to the sub-problems are combined at the production planning system to obtain a new optimal or near-optimal but acceptable solution.

It will be appreciated that various of the above-disclosed and other features and functions, or alternative thereof, may be desirably combined into many other different systems or application. Various presently unforeseen or unanticipated alternatives, modifications, variation, or improvements therein may be subsequently made by those skilled in the art which are also intended to be encompassed by the following claims.

What is claimed is:

1. An automated system for determining the profitability of accommodating a rush print job, comprising:
a production planning processor including an admissions control module in communication with a queue management module, the admissions control module being configured to determine a first profit for expedited handling of the rush print job by calculating
a maximum profit Pmax for accommodating the rush print job by:
inserting the rush print job into an existing queue without re-ordering print jobs, and/or
inserting the rush print job into an existing queue and re-ordering at least one print job,
wherein Pmax is calculated by subtracting penalties for print jobs that are delayed as a result of inserting said rush print job into said existing queue, from an anticipated profit for the rush print job.

2. The system of claim 1, wherein the admissions control module includes a cost analyzer configured to determine service cost and completion time for each submitted print job.

3. The system of claim 1, wherein the queue management module includes a job routing portion configured to manage a plurality of printer queues.

4. The system of claim 1, wherein the queue management module comprises a memory containing printer queue data.

5. The system of claim 1, wherein the queue management module includes a job batching portion.

6. The system of claim 2, wherein the cost analyzer contains data for quality of service requirements.

7. The system of claim 1, wherein the admissions control module further calculates a simple profit $P_s$ based on placement of the rush print job at the beginning of the queue without re-ordering other print jobs.

8. The system of claim 1, wherein the admissions control module is configured to calculate $P_{max}$ wherein the rush print job is to be accommodated by inserting the rush print job into an existing queue without re-ordering print jobs.

9. The system of claim 1, wherein the admissions control module is configured to calculate $P_{max}$ when the rush print job is to be accommodated by inserting the rush print job into an existing queue and re-ordering at least one print job in the existing queue.

10. The system of claim 1, wherein the production planning processor is part of a computer that is operative of printer hardware.

11. The system of claim 1, wherein the production planning processor is disposed upstream from a computer that is operative of printer hardware.

12. The system of claim 1, wherein the queue management module is external from the production planning processor.

13. The system of claim 1, wherein the admissions control module and queue management module are connected through a system state controller that looks at the current state of the system with respect to the queue.

14. The system of claim 13, wherein the system state controller is part of the queue management module.

15. The system of claim 13, wherein the system state controller is part of the admissions control module.

16. The system of claim 1, wherein the queue management module is connected to a job chunking module that divides a large print job into batches, which can be printed independently of one another.

17. The system of claim 16, wherein the job chunking module is connected to a printer sharing module that handles at least one of routing of print jobs and scheduling of print jobs.

18. The system of claim 1, wherein the production planning processor is connected to a plurality of production lines.

19. The system of claim 1, wherein the admissions control module further calculates a consolidation profit Pcon based on a reduction in padding time between queued print jobs.

* * * * *